(No Model.) 2 Sheets—Sheet 1.

J. ROOS.
LIQUID MEASURING DEVICE.

No. 481,872. Patented Aug. 30, 1892.

WITNESSES:
H. Walker
E. M. Clark

INVENTOR:
Jacob Roos
BY Munn & Co
ATTORNEYS.

(No Model.) 2 Sheets—Sheet 2.
J. ROOS.
LIQUID MEASURING DEVICE.
No. 481,872. Patented Aug. 30, 1892.
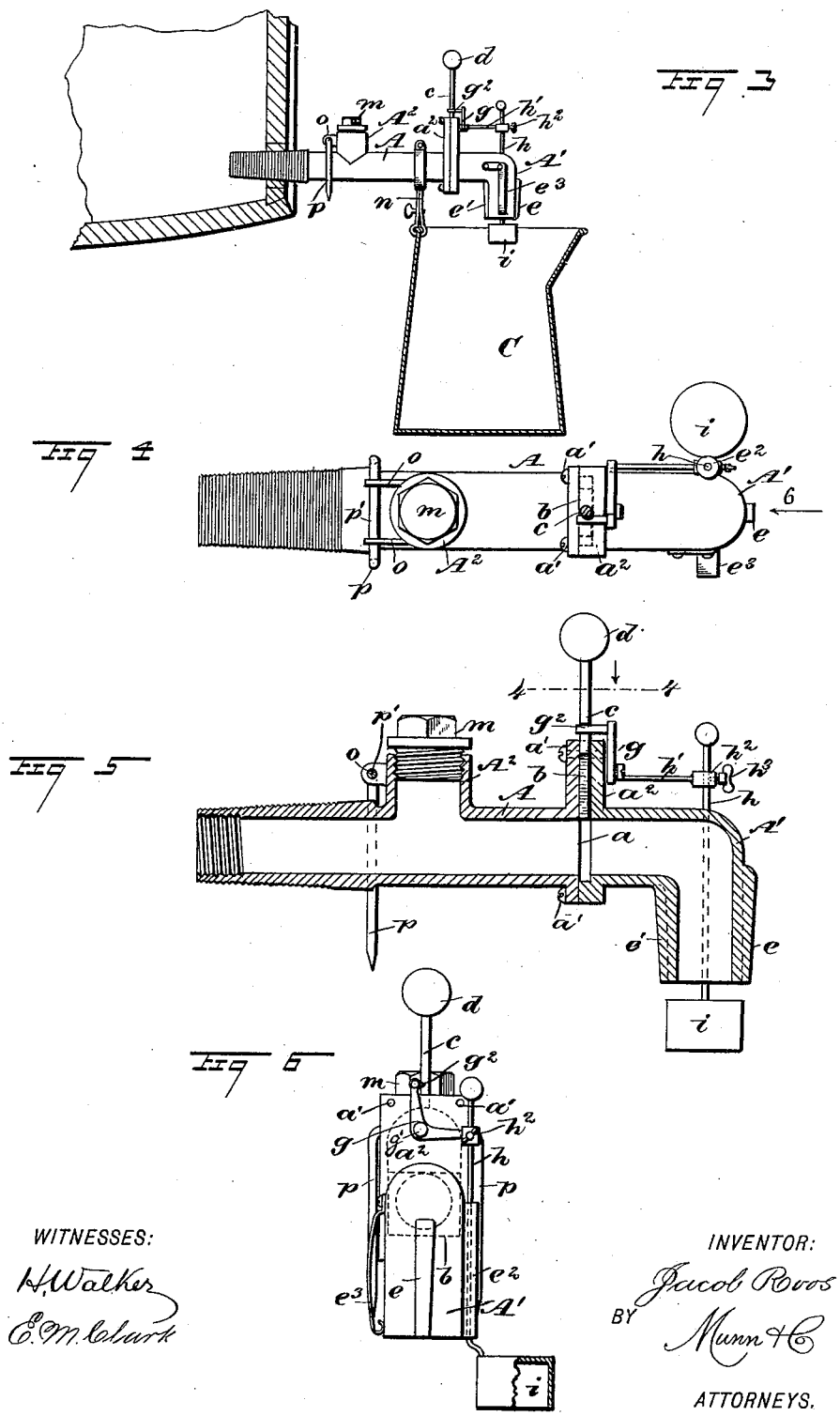
WITNESSES:
H. Walker
E. M. Clark
INVENTOR:
Jacob Roos
BY Munn & Co
ATTORNEYS.

UNITED STATES PATENT OFFICE.

JACOB ROOS, OF BROOKLYN, NEW YORK.

LIQUID-MEASURING DEVICE.

SPECIFICATION forming part of Letters Patent No. 481,872, dated August 30, 1892.

Application filed February 2, 1892. Serial No. 420,072. (No model.)

*To all whom it may concern:*

Be it known that I, JACOB ROOS, of Brooklyn, in the county of Kings and State of New York, have invented a new and useful Liquid-Measuring Device, of which the following is a full, clear, and exact description.

The object of this invention is to provide a simple practical device which will afford means to fill vessels of different dimensions with a liquid material and automatically cut off the delivery of fluid at a predetermined point within the receiving-vessel.

A further object is to furnish a measuring draw-cock that will be adapted to receive a liquid supply from a flexible hose, a metal tube, a pump, or a barrel, and deliver the same in predetermined quantity within a cask, can, or other receiving-vessel, cutting off the flow when the desired quantity is decanted by a contact of the discharged liquid with a part of the device.

To the ends indicated my invention consists in the peculiar construction of parts and their combination, as is hereinafter described and claimed.

Reference is to be had to the accompanying drawings, forming a part of this specification, in which similar letters of reference indicate corresponding parts in all the figures.

Figure 1:
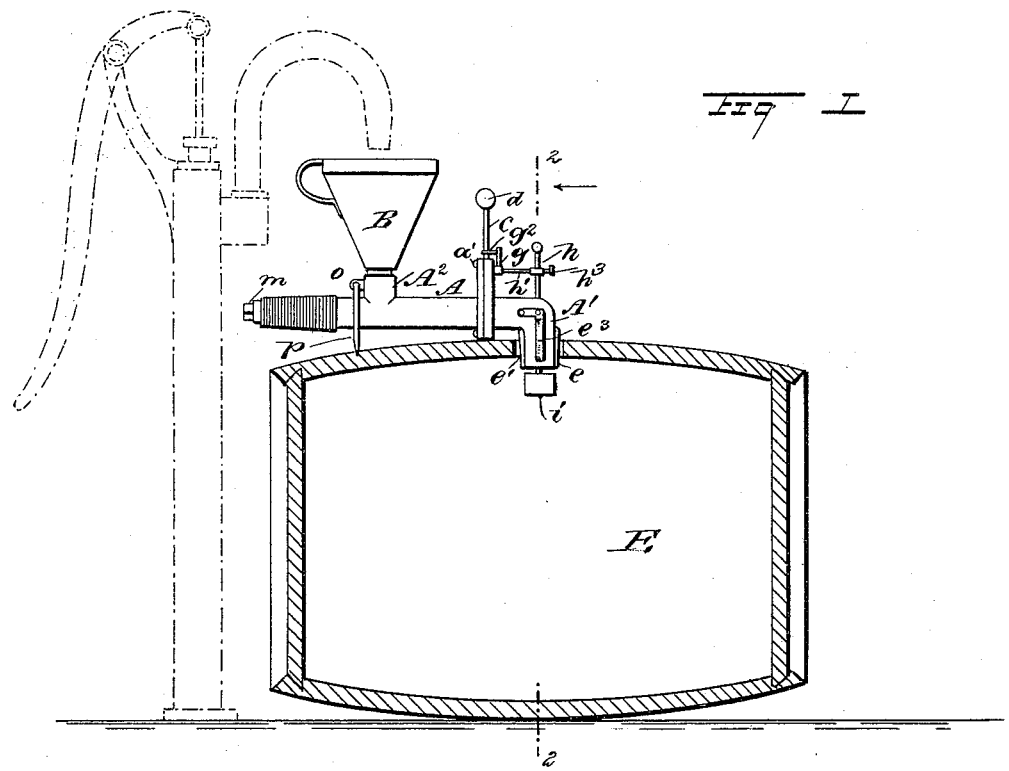
Figure 2:
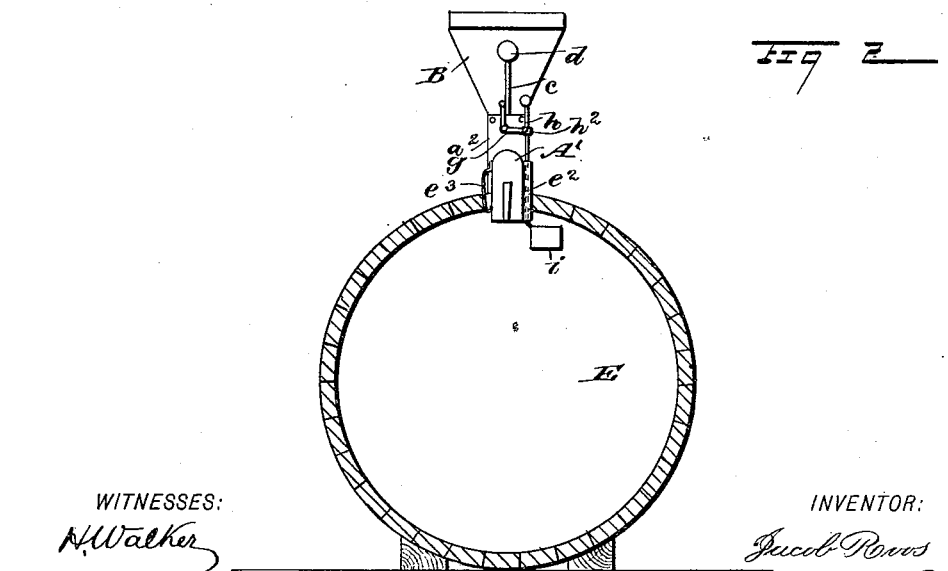

Figure 1 is a side view of the device in position upon a cask that is to be filled with liquid from a pump, the cask being shown in longitudinal section and the pump by dotted lines. Fig. 2 is a transverse section of a cask, taken through the longitudinally-central bung-hole with the device in place on the cask and its discharge-nozzle inserted within the bung-hole. Fig. 3 is a side view of the improved automatic draw-cock inserted in the head of a cask shown in part, the draw-cock being clamped on the top edge of a receiving-vessel and adapted to discharge liquid from the cask into said vessel. Fig. 4 is an enlarged sectional plan of the improvement, taken on the line 4 4 in Fig. 5. Fig. 5 is a longitudinal section of the device shown in Fig. 4, with a portion restored that is removed in said figure; and Fig. 6 is a front end view of the automatic stop-cock, taken opposite the arrow 6 in Fig. 4.

The improved liquid-measuring device, briefly described, consists of a draw-cock that is adapted to be screwed into a cask-head and discharge its contents in any desired quantity into another vessel, and a drop-gate in the stop-cock body having a loose engagement with a trigger mechanism that is moved to drop the gate by an attached cup, which is elevated by its contact with the rising column of liquid in the receiving-vessel. Provision is also made to connect the receiving end of the draw-cock body with a line of hose or a metal pipe that extends to a liquid-supply, which is adapted to flow by gravity through the cock and be controlled in its escape therefrom by the drop-gate and trigger mechanism mentioned.

The improvement furthermore embodies a funnel attachment that is removably secured on its body to introduce liquid within the same, the ordinary receiving end of the cock-body in this case being plugged up to prevent escape of liquid therefrom, the discharge of the latter from the nozzle of the cock being controlled by the drop-gate and its trigger mechanism, as will be more fully described.

The draw-cock body is substantially cylindrical, and is preferably constructed of two portions A A' to facilitate its manufacture, the junction of parts being effected at $a$, where a transverse slideway is provided for the liquid-controlling gate $b$, which is a flat plate adapted to move in a vertical plane, liquid-tight where it emerges from the upper edge of the slideway. Centrally on the top edge of the slide-gate $b$ a rod $c$ projects vertically of a proper length, and on its upper end a weight $d$, preferably in the form of a ball, is secured, which is of sufficient heft to cause the gate to descend quickly when the latter is free to move. The impinging flanged portions of the body-sections A A', wherein opposite channels are formed to produce the slideway $a$, are detachably joined together by the screw-bolts $a'$, whereby a rectangular box $a^2$ is produced that sufficiently projects above the cylindrical body A A' to allow the lower edge of the gate $b$ to clear the passage through said body when this is desired. The forward section A' of the cylindric body is bent to cause its free end portion to depend and form a discharge-nozzle, and on the exterior of this depending portion three ribs $e$ $e'$ $e^2$ are projected longitudinally at about equal distances apart—$e$ in front, $e'$ at the rear, and the remaining rib $e^2$ at one side—a plate-spring $e^3$ being secured on the nozzle vertically and opposite the last-named rib. On the front side of the guide-box $a^2$ a bell-crank lever $g$ is pivoted at the junction of its limbs, as at $g'$ in Fig. 6, the upright member of the bell-crank having a toe $g^2$ projected laterally near its terminal, which will enter a notch or groove in the side of the rod $c$ when the slide-gate $b$ is fully elevated, the notch being so located as to allow such a loose connection of parts to be effected. A vertical perforation is formed in the rib $e^2$ for the reception of a trigger-rod $h$, that slides loosely through the rib and projects above and below it a suitable distance. On the lower end portion of the rod $h$ an inverted cup $i$ is affixed, the rod engaging the side of the cup, which latter is preferably made of sheet metal, cylindrical in form and of a diameter about equal with that of the discharge-nozzle. A sufficient offset is formed in the lower part of the trigger-rod $h$ where it is attached to the cup $i$ to permit a vertical alignment of said cup below the body of the nozzle or a removal therefrom if the cup is swung laterally. Upon the portion of the trigger-rod $h$ that extends above the rib $e^2$ a finger-bar $h'$ is adjustably located, the connection being effected by a coupling-block $h^2$, formed on the end of the finger-bar, through which the trigger rod slides, a set-screw $h^3$ affording means to clamp the finger-bar at any desired point on the rod and hold it extended therefrom at a right angle. The horizontal limb of the bell-crank lever $g$ is sufficiently extended toward the side of the section $A'$ whereon the rib $e^2$ is formed to permit the adjacent end of the finger-bar $h'$ to enter a perforation in the outer end of the said crank-limb, which connection will adapt the vertical movement of the trigger-rod $h$ to rock the bell-crank lever. There is a branch piece $A^2$, formed on the upper side of the body-section A, which provides an inlet to the longitudinal passage in the latter, said neck or branch being internally threaded to receive a screw-plug $m$ or the threaded lower end of a funnel B. The rear end portion of the body-section A is internally threaded to receive a hose-coupling of ordinary form (not shown) or the threaded end of a metallic pipe that may be extended from a liquid-holding reservoir, and on the exterior of said end portion, which is properly tapered, a thread is formed that will afford means to secure the draw-cock in the perforated head of a cask, as shown in Fig. 3.

When the device is to be used to tap the contents of a barrel into any number of vessels or draw a single measureful therefrom, the receiving-vessel—such as C—is placed below the discharge-nozzle of the draw-cock, and the body of the latter is secured to the upper edge of the vessel by a clamp $n$. The gate $b$ is now raised until there is an interlocking connection produced between the notched rod $c$ and the toe $g^2$ on the bell-crank lever $g$, which will permit a free flow of liquid from the cask. When the vessel C, which may be a gallon-measure, is almost brimful, the cup $i$ will be immersed sufficiently to compress air within it and permit the liquid to lift said cup, rock the bell-crank, and drop the gate $b$, so as to cut off the flow of liquid automatically, the vertical adjustment of the trigger-rod and finger-bar on it enabling the operator to set the cup at a correct point so as to drop the gate at a proper instant and fill the vessel without overflow.

If the draw-cock is to be used for the filling of a cask from a tank below by means of a pump or from any other source that will require the liquor to be first decanted into the funnel B, the funnel is secured in the branch $A^2$, as before explained, and the nozzle end of the body-section $A'$ inserted in the bung-hole of the receiving-cask E, the plate-spring $e^3$, which is slightly elliptical, serving to retain the forward end of the device erect. At the rear of the branch $A^2$ a pair of ears $o$ are projected, (see Figs. 4 and 5,) which ears are perforated laterally in alignment for the support of a pair of prop-legs $p$, that are preferably formed integral with a transverse piece $p'$, which passes through the ears, the legs being bent at right angles to the cross-piece in the same direction. The screw-plug $m$ is utilized to stop the rear end of the body-section A when the device is used, as shown in Figs. 1 and 2, and the prop-legs $p$ are inserted into the cask slightly, so as to afford support to the draw-cock body near to the funnel B. The gate $b$ is now set in an elevated position and the cup $i$ swung laterally, so as to allow it to rise in the cask. Liquid of any kind that is to be introduced within the cask E is now pumped or poured into the funnel B, and from thence will pass into the cask, or a line of hose may be employed to conduct liquid to the funnel. When the cask E is nearly full, the cup $i$ will be engaged by the liquid as it rises toward the bung-hole, and at a predetermined point the gate-valve $b$ will fall and cut off the flow of liquid through the nozzle of the draw-cock.

It will be seen that the device may be utilized to safely fill any vessel or partly fill the same, as may be desired, thus serving as a measure of quantity for liquids that are to be decanted from one vessel to another, or as a safety tapping-faucet for a cask or similar vessel.

Having thus described my invention, I claim as new and desire to secure by Letters Patent—

1. A faucet barrel or body having a branch opening between its ends, a closure adapted to close said opening and also the rear end of the barrel or body, and a float-operated valve in the forward end of the barrel or body, substantially as shown and described.

2. A faucet barrel or body having its rear end tapered to fit the outlet-aperture of a barrel and its opposite depending end longitudinally ribbed or corrugated to fit the filling aperture or bung, and a float-operated valve between the ends of said barrel or body, the float being adjacent to the depending end of the body or barrel, substantially as set forth.

3. The combination, with the barrel or body provided with a downwardly-projecting forward end and a vertically-extending slideway in rear of said forward end, of the vertically-sliding gate-valve in said slideway, a bell-crank lever pivoted on the barrel with its upper end constructed to loosely engage and support the gate when raised, a vertically-adjustable float-rod extending down alongside the said downwardly-projecting end, connections between the horizontal arm of the bell-crank lever and the upper end of the float-rod, and a float on the lower end of the rod, substantially as set forth.

4. The combination, with a draw-cock body having a depending nozzle, of vertical ribs thereon and a spring opposite one rib, substantially as described.

5. The combination, with a draw-cock body having a branch or inlet at right angles to its longitudinal passage, of a funnel securable thereto, means to stop the rear end of the body, and an automatically-dropping gate near the discharge end of the body, substantially as described.

6. The combination, with a hollow elongated body having a depending nozzle that is adapted to be removably secured in a barrel bung-hole, of a pair of prop-legs secured to swing on the body near its rear end, a branch inlet-neck on the body, and a funnel securable therein, substantially as described.

7. The combination, with a hollow elongated body having a depending nozzle securable in a cask bung-hole, of a hollow cup thereon adapted to swing laterally with an upright trigger-rod, a lateral finger-bar on the rod, which is adjustable for height, a bell-crank lever having one limb engaged with the end of the finger-bar and the other limb engaged loosely with a notch in a vertical valve-rod, a sliding gate-valve, a notched rod thereon, and a weight on the rod, substantially as described.

8. In a liquid-measuring device, a gate-valve-trigger mechanism comprising a pivoted bell-crank lever having one limb loosely engaged with a notched rod on the gate-valve, a supported cup-shaped float, a trigger-rod engaging the cup-float below, and having an adjustable finger-bar above, which loosely engages the other limb of the bell-crank lever, substantially as described.

JACOB ROOS.

Witnesses:
WILLIAM P. PATTON,
FRANK MARTIM.